(No Model.) 3 Sheets—Sheet 1.
D. J. AMES.
COTTON SEED REDUCING AND SEPARATING MACHINE.
No. 352,285. Patented Nov. 9, 1886.
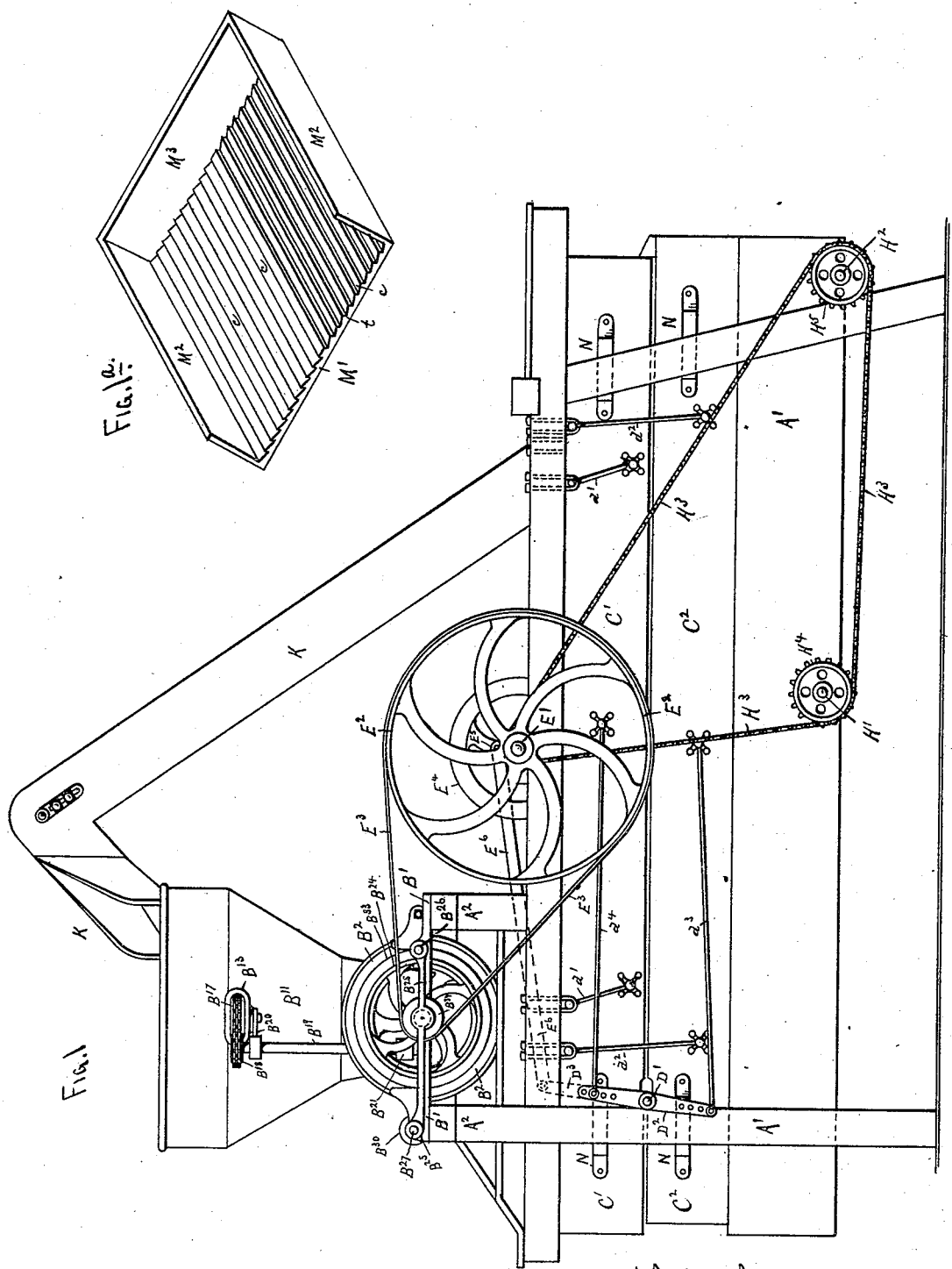

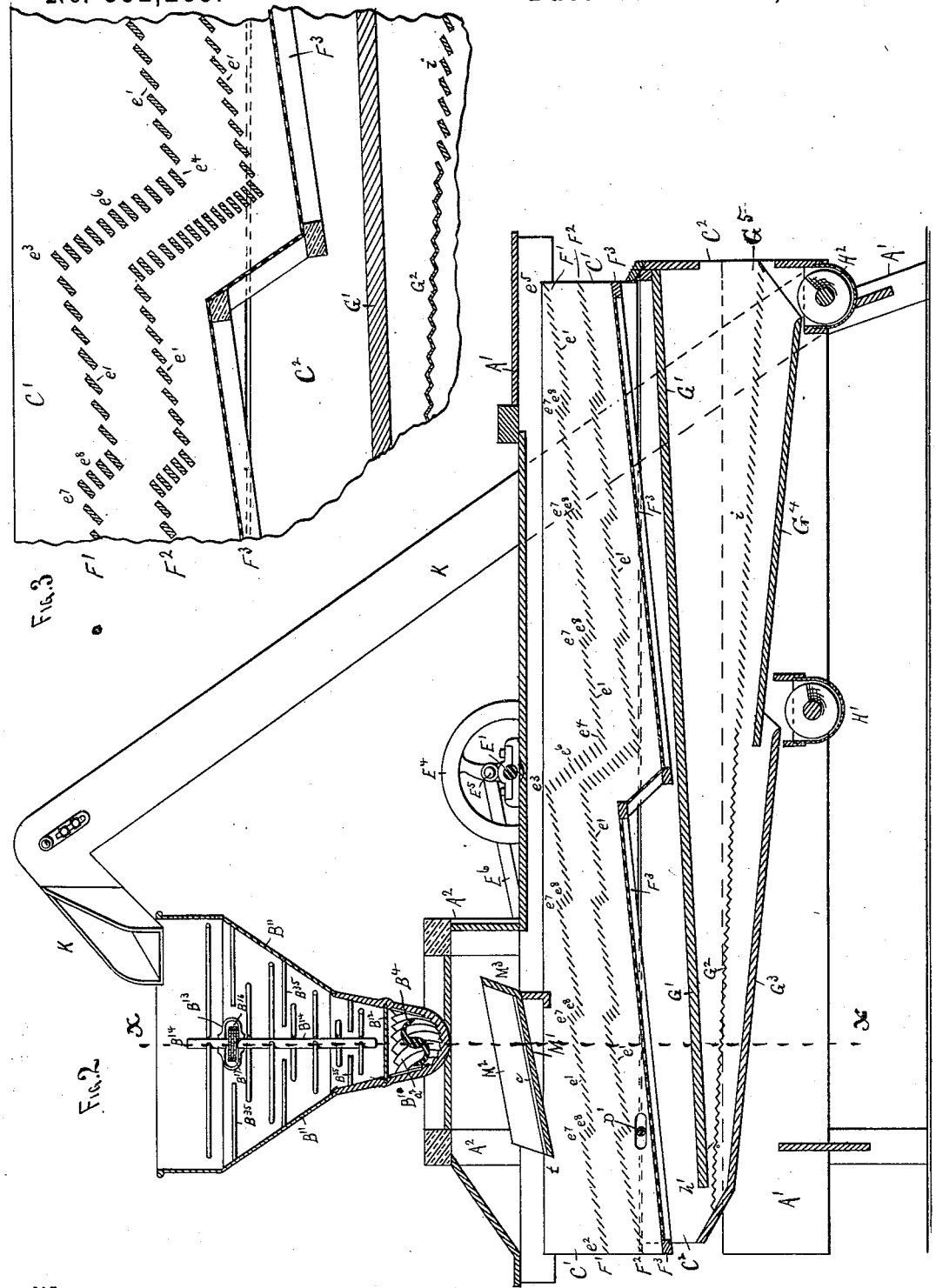

(No Model.)  3 Sheets—Sheet 3.
D. J. AMES.
COTTON SEED REDUCING AND SEPARATING MACHINE.
No. 352,285. Patented Nov. 9, 1886
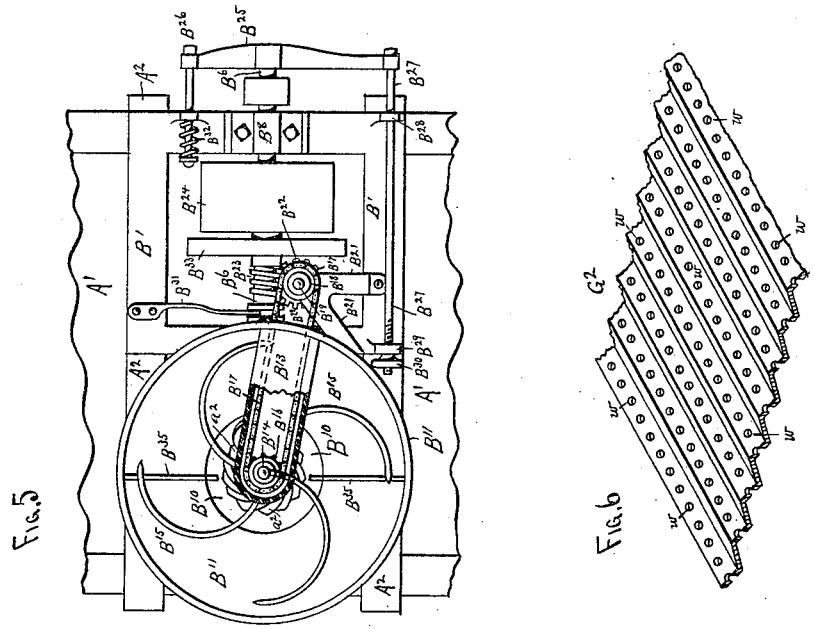
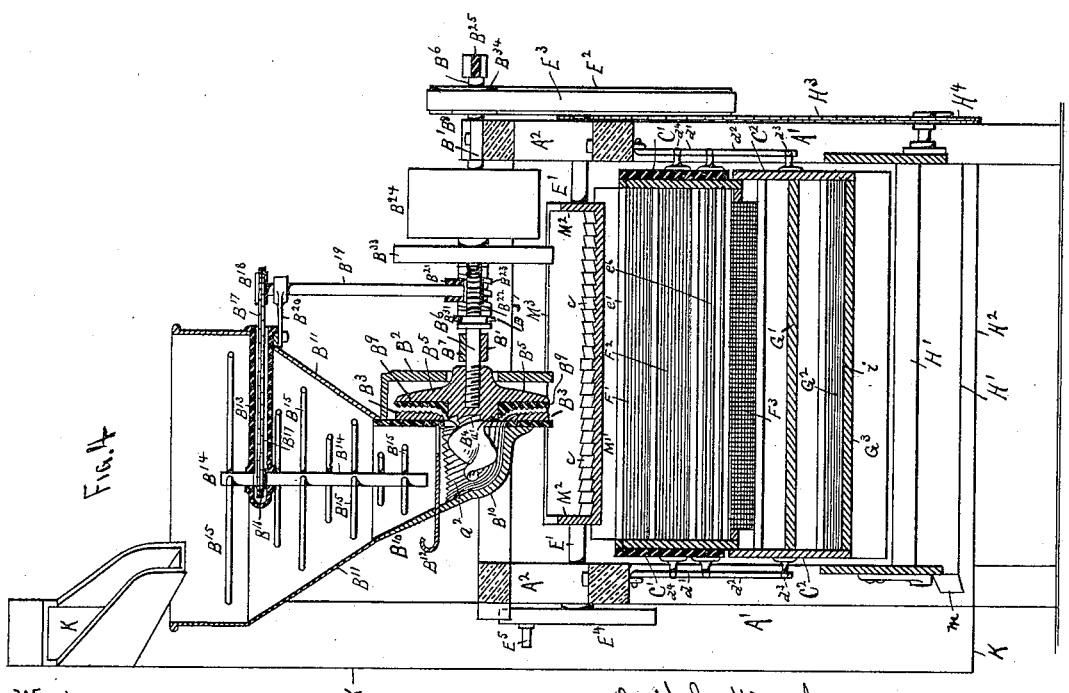

UNITED STATES PATENT OFFICE.

DAVID JACKSON AMES, OF OWATONNA, MINNESOTA.

COTTON-SEED REDUCING AND SEPARATING MACHINE.

SPECIFICATION forming part of Letters Patent No. 352,285, dated November 9, 1886.

Application filed October 12, 1885. Serial No. 179,575. (No model.)

*To all whom it may concern:*

Be it known that I, DAVID JACKSON AMES, a citizen of the United States, and a resident of Owatonna, in the county of Steele and State of Minnesota, have invented certain new and useful Improvements in Cotton Seed Reducing and Separating Machines, of which the following specification is a full, clear, and exact description, reference being had to the accompanying drawings, in which—

Figure 1 is a side elevation of the machine complete. Fig. 1ª is a detached perspective view of the distributing-shoe. Fig. 2 is a longitudinal sectional elevation. Fig. 3 is an enlarged sectional detail of the separating-screens. Fig. 4 is a cross-sectional view on the line $x\ x$ of Fig. 2. Fig. 5 is a plan view of part of the reducing mechanism. Fig. 6 is an enlarged perspective view of a section of the perforated and corrugated sheet-metal screen.

A' represents a frame-work in which the separating-screens are suspended and adapted to be vibrated, and having across its upper side, near one end, a smaller frame, $A^2$, supporting the bed-frame B' of the reducing-machine. This reducing-machine consists of a fixed casing, $B^2$, attached to or forming part of the bed-frame B', and supplied on its interior with grinding disk or ring $B^3$, having an open center through which a screw-shaped feed blade or blades, $B^4$, on the shaft of a revolving disk, $B^5$, is inserted. The disk $B^5$ is within the casing $B^2$, and screwed upon one end of a shaft, $B^6$, the latter passing out through the rear of the casing, and being journaled upon the frame B' by bearings $B^7\ B^8$. The face of the disk $B^5$ is supplied with a grinding-ring, $B^9$, similar to and adapted to coact with the ring $B^3$. The contiguous surfaces of the rings $B^3$ and $B^9$ will be grooved and furrowed in the same manner as shown in patent of D. J. and E. J. Ames, No. 226,152, April 6, 1880, or with any other suitable system of dress. The inner portion of the screw feed-blade $B^4$ will be provided with tangential feed-cavities $a'$, to assist in guiding the material from the screw feed-blades outward to the furrows of the grinding-disks.

On the face of the casing $B^2$ is formed a hopper, $B^{10}$, into which the material which is to be reduced is fed from a larger hopper, $B^{11}$, which fits on top of the hopper $B^{10}$, and forms a continuation thereof. The interior of the lower part of the hopper $B^{10}$ is provided, as shown at $a^2$, with curved furrows, which coact with the screw feed-blade $B^4$, to cause the material to be drawn and forced forward between the grinding-disks.

Above the furrows $a^2$ and screw-blade $B^4$ the hopper $B^{10}$ is provided with a slide, $B^{12}$, by which the supply of material from the hopper $B^{11}$ may be regulated or entirely shut off, if required.

Within the hopper $B^{11}$ is suspended from a hollow frame, $B^{13}$, an upright shaft, $B^{14}$, armed with curved S-shaped cross-rods $B^{15}$. Within the hollow frame $B^{13}$, and fast on the shaft $B^{14}$, is a chain-pulley, $B^{16}$, from which an endless chain, $B^{17}$, leads around another chain-pulley, $B^{18}$, on an upright shaft, $B^{19}$, outside the hopper $B^{11}$. The hollow frame $B^{13}$ thus serves the double purpose of a support or hanger for the shaft $B^{14}$ and as a housing in which the chain $B^{17}$ is protected and prevented from becoming clogged by the seed in the hopper. The upper end of the shaft $B^{19}$ is supported by a hanger, $B^{20}$, from the hopper $B^{11}$, while its lower end is supported by a step, $B^{21}$, attached to the base-frame B'. The shaft $B^{19}$ is provided on its lower end with a worm-gear, $B^{22}$, adapted to engage with a worm, $B^{23}$, on the shaft $B^6$, by which means the shafts $B^{19}$ and $B^{14}$ are revolved.

A balance-wheel, $B^{33}$, and band-wheel $B^{24}$ are shown upon the shaft $B^6$, the band-wheel being adapted to receive the belt by which the shaft is driven. The shaft $B^6$ extends out beyond the frame B', and across this extended end is shown a bar or lever, $B^{25}$, one end of this lever being connected by a bolt, $B^{26}$, to the frame B', and the other end supplied with an adjusting-rod, $B^{27}$. This adjusting-rod passes through lugs $B^{28}\ B^{29}$ on the frame B', and is supplied on the end opposite to the lever $B^{25}$ with a hand-wheel, $B^{30}$, screwed onto the rod. By this arrangement the shaft $B^6$ may be moved endwise to adjust the revolving disk $B^9$ nearer to the disk $B^3$, while a spring, $B^{31}$, attached to the frame B', and adapted to act upon the shaft $B^6$, serves to hold the shaft $B^6$ outward, and thus prevent the disks running together when the hopper runs dry. The bolt $B^{26}$ is shown provided with a spring, $B^{32}$, which will be powerful enough to resist the action of the proper material passing through the mill, but will allow the disk $B^5$ and shaft $B^6$ to be forced backward to throw the disks $B^3 B^9$ apart should any hard foreign substance pass into the mill, and thus prevent injury to the "dress" of the grinding-plates or breaking the machine. The spring $B^{32}$ may be placed upon the rod $B^{27}$, or at any other suitable point, if preferred.

The separating mechanism consists of two "shoes" or frames, $C' C^2$, arranged one above the other in the frame $A'$, and provided with systems of screens, riddles, conveyers, &c., by which the meal is separated from the hulls and lint. The upper shoe, $C'$, is suspended from the frame $A'$ by suspension-rods $d'$, two on each side of the shoe, or one near each corner, while the lower shoe, $C^2$, is suspended by rods $d^2$ in a similar manner.

$D'$ is a shaft journaled across the frame $A'$, near one end, between the shoes $C' C^2$, and provided on each end with an arm, $D^2$, the arms being attached to the shaft at or near their centers. The lower end of each arm is connected by a rod, $d^3$, to the shoe $C^2$, and the upper end of each arm is connected by a rod, $d^4$, to the shoe $C'$.

Each side of the machine will be supplied with a set of these hangers and rods $d' d^2 d^3 d^4$ and arms $D^2$, only one set being shown in Fig. 1, and partially in Fig. 4; but as the arrangement of rods and arms is alike on both sides of the machine the illustration is sufficient to show the mechanical construction and explain the mode of operation.

Across the top of the machine is journaled a shaft, $E'$, carrying a belt-pulley, $E^2$, on one end adapted to be driven by a belt, $E^3$, from a belt-pulley, $B^{34}$, on the shaft $B^6$, while the other end of the shaft $E'$ is shown supplied with a wheel, $E^4$, having a crank-pin, $E^5$, from which a connecting-rod, $E^6$, leads to the extended upper end, $D^3$, of one of the arms $D'$. This extended end $D^3$ and its connection with the rod $E^6$ is shown only by dotted lines in Fig. 1. By this arrangement it will be readily seen that the rapid revolving motion of the shaft $B^6$ will be communicated to the shaft $E'$ by the belt $E^3$, but at a reduced speed, and the slow-revolving motion of the shaft $E'$ utilized by the rod $E^6$, arms $D^2$, shaft $D'$, and rods $d^3 d^4$ to reciprocate or vibrate the shoes $C' C^2$ alternately.

The suspension-rods $d'$ are shown trending toward the shaft $D'$ at their upper ends, so that the motion of the upper shoe will be upward and away from the feed end and downward and toward the feed end, thus imparting a tossing motion to the material passing over the screens and riddles in the shoe. The suspension-rods $d^2$ of the shoe $C^2$ are longer than the rods $d'$, and are intended to hang very nearly perpendicularly, so that the motion of the shoe $C^2$ is very nearly horizontal.

Across the interior of the shoe $C'$ is arranged two screens or riddles, $F' F^2$, formed of parallel wooden slats $e'$, and one screen or riddle, $F^3$, of wire-cloth, beneath them. The screens $F' F^2$ consist of small wooden slats $e'$, set in angular position and inclining away from the feed end, the upper edge of one slat coming above the lower edge of the next one, and said screens are arranged in two main sections or sets throughout the length of the shoe, each of these main sections being arranged in smaller sections.

The slats may be of any suitable size and the sections of any suitable length; but I have found that slats about one-fourth of an inch thick and one inch in width, arranged in two main sections throughout the length of the shoe, with the smaller sections about one foot in length, produce the best effects. In Figs. 2 and 3 the arrangement of these slats is clearly shown.

In Fig. 2, from $e^2$ to $e^3$ represents one main section and from $e^4$ to $e^5$ represents the other main section. The lower ends, $e^2 e^4$, of the main sections are in the same horizontal plane, while the upper ends, $e^3 e^5$, are in the same horizontal plane, the space between the ends $e^3 e^4$ being filled with slats $e^6$, so that no break occurs between the sections. Each of the main sections of slats $e'$ are arranged in smaller sections, $e^7$, with slats $e^8$ connecting the sections. These screens $F' F^2$ are precisely alike, except that the individual slats of the screen $F^2$ are a trifle nearer together than the slats of the upper screen, so that it will separate finer material than the upper screen.

The wire-cloth screen $F^3$ consists merely of a frame-work parallel with the screen $F^2$, and forming the bottom of the shoe $C'$. In the top of the shoe $C^2$ is arranged a board or carrier, $G'$, inclining downward toward the feed end of the machine and adapted to receive all the material that falls through the wire-cloth screen $F^3$ and feed it over its lower end, $h'$, upon a corrugated and perforated metal screen, $G^2$, inclined in the opposite direction from the carrier-board $G'$ and extending a little more than one-half the length of the shoe $C^2$. A section of the screen $G^2$ is shown in Fig. 6, which shows it formed of V-shaped corrugations, with perforations $w$ at regular intervals, this screen being intended to effect the final separation of the meal from the lint and hulls of the seeds. From the end of the screen $G^2$ the shoe $C^2$ is occupied with a series of inclined slats, $i$, similar to the slats $e'$ of the screens $F' F^2$.

Beneath the screen $G^2$ is arranged a carrier-board, $G^3$, on which the material falling through the screen $G^2$ is conducted into a screw-conveyer, $H'$, and from thence conveyed out through the side of the machine, as shown at $m$ in Fig. 4, while a similar carrier-board, $G^4$, is arranged beneath the slats $i$, to conduct the material falling between the slats into another screw-conveyer, $H^2$, by which it is fed into an elevator, $K$, and thence carried upward into the hopper $B^{11}$ to be reground.

Between the screen $F'$ and the discharge from the casing $B^2$ is arranged a distributing-shoe, consisting of a slightly-inclined corrugated or furrowed board, $M'$, having sides $M^2$ and rear end, $M^3$, to cause all the material to flow over the lower edge, t. The furrows c in the board M' are arranged perpendicularly on one side and inclined on the other, the inclinations running upward and outward from the center, so that as the material falls upon the board M' its vibratory motion with the shoe C' will cause the inclined furrows to spread the material evenly over the surface of the board and feed it over the edge t in a thin uniform stream, so that the whole width of the slats e' receives an equal share of the material.

This distributing-shoe may be arranged to be vibrated either with the shoe C' or independently thereof, and it may be arranged with its discharge edge t at right angles to or parallel with the slats e'.

The conveyers H' H² are shown arranged to be driven by an endless chain, H³, from a chain-pinion on the shaft E', running around sprocket-wheels H⁴ H⁵ on the shafts of the conveyers, while the elevator K will be driven from the shaft of the conveyer H².

"Rub-plates" N will be attached to the shoes C' C², opposite the posts of the frame A', to guide the shoes in their vibratory movements and keep them parallel with the frame A'. The cotton-seed, as it is fed into the hopper B', is covered with the remains of the "cotton-boll" or cotton-lint, which causes them to cling together in a mass; hence the first operation to be performed is to separate the individual seeds, which is effectually accomplished by the revolving rods B¹⁵ in the hopper B¹¹, and the seed is then fed in between the disks B³ B⁹, where they are reduced to a meal and fed upon the upper screen, F', in a thin even stream by being passed over the distributing shoe M', as before described. The shoe C' being rapidly vibrated with a tossing motion, causes the slats e' to catch the material and throw it upward, and thus separate the fine meal, hulls, and lint from each other, the finer particles falling between the slats e' upon the next screen, F², where it is still further separated, and the finest particles falling upon the wire-cloth screen F³. The inclined position of the slats e' causes them to pass beneath the material when moved in one direction, and catch it and move it along the shoe C' away from the feed end when moved in the opposite direction, while at the same time imparting to it a tossing motion, which thoroughly separates the fine meal from the hulls and lint, and finally discharging the hulls and lint over the tail G⁵ of the shoe. When the mass of material reaches the upper end of each of the sections of slats e', it falls over upon the next section, and thus still further separates the particles, and when the ends of the main sections are reached the material is subjected to a still greater agitation by falling a greater distance, as at e⁶.

As before stated, the slats of the screen F' are a trifle farther apart than the slats of the screen F², so that a double separation is effected, some of the finer particles of the hulls and lint finding their way to the screen F², whereon a still finer separation occurs, the material which finally passes through the wire-cloth screen being entirely reduced meal and finer particles of the hulls and lint. This reduced meal, and what small amount of lint and unreduced hulls it may still contain, is then fed to the finer screen G² over the board G', where the final separation takes place, the lint and unreduced particles of the hulls which still remain being fed to the slats i, where the hulls are separated from the lint and conveyed by the elevator K to the hopper B¹¹ to be reground, and the lint only discharged at G⁵ over the tail of the shoe C². Stationary rods B³⁵ will be inserted into or across the hoppers B¹⁰ and B¹¹ to break the material up and prevent it gathering in a mass and revolving in the hopper.

Having described my invention and set forth its merits, what I claim is—

1. In a machine for reducing cotton-seed, a reducing mechanism comprising a casing, B², vertical stationary grinding-disk B³, vertical revolving disk B⁵ B⁹, horizontal feed-screw B⁴, attached to the face of the revolving grinding-disk and extending through the stationary grinding-disk into the hopper, lower hopper, B¹⁰, provided with grooves a² in its inner surface, upper hopper, B¹¹, and revolving agitating-fingers B¹⁵ in the upper hopper, substantially as and for the purpose herein set forth.

2. The herein-described grinding-mill comprising the vertical stationary grinding-disk B³, vertical revolving grinding-disk B⁵ B⁹, horizontal feed-screw B⁴, attached to the face of the revolving grinding-disk and extending through the stationary grinding-disk into the hopper, lower hopper, B¹⁰, provided with grooves a² in its inner surface, upper hopper, B¹¹, provided with a hollow hanger, B¹³, vertical shaft B¹⁴, having its bearing in the said hanger and provided with agitating-fingers B¹⁵, vertical shaft B¹⁹, chain-gear B¹⁷, connecting the said vertical shafts and running in the said hollow hanger, worm-wheel B²² on the shaft B¹⁹, and worm B²³ on the shaft of the revolving grinding-disk, substantially as and for the purpose herein specified.

3. The herein-described separator comprising the frame A', upper shoe, C', the screens F' F², formed of inclined sections of inclined slats e' e', the inclined wire-cloth screen F³, the backwardly inclined suspension-rods d' d', the lower shoe, C², the carrier-board G', the corrugated and perforated metal screen G², the inclined slatted screen i, and the distributing-shoe M', having an inclined furrowed surface, c, and arranged above the feed end of said shoe, substantially as and for the purpose herein specified.

In testimony whereof I have hereunto set my hand in presence of two subscribing witnesses.

DAVID JACKSON AMES.

Witnesses:
W. A. SPERRY,
LEWIS L. WHEELOCK.